United States Patent
Choi et al.

(10) Patent No.: US 10,352,286 B2
(45) Date of Patent: Jul. 16, 2019

(54) STARTER-GENERATOR SYSTEM

(71) Applicants: Hyundai Motor Company, Seoul (KR); Kia Motors Corporation, Seoul (KR)

(72) Inventors: Kum Lim Choi, Seoul (KR); Woo Seok Choi, Seoul (KR); Chi Won Shon, Hwaseong-si (KR); Sang Suk Lee, Suwon-si (KR); Keun Seok Lee, Hwaseong-si (KR); Uk Han Kim, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 114 days.

(21) Appl. No.: 15/808,497

(22) Filed: Nov. 9, 2017

(65) Prior Publication Data

US 2018/0340505 A1    Nov. 29, 2018

(30) Foreign Application Priority Data

May 25, 2017    (KR) .................. 10-2017-0064514

(51) Int. Cl.
*F02N 11/04* (2006.01)
*F02N 15/02* (2006.01)
*F16H 37/02* (2006.01)
*F16H 7/08* (2006.01)

(52) U.S. Cl.
CPC ............ *F02N 11/04* (2013.01); *F02N 15/022* (2013.01); *F16H 7/08* (2013.01); *F16H 37/02* (2013.01); *F16H 2007/0865* (2013.01); *F16H 2007/0897* (2013.01)

(58) Field of Classification Search
CPC .......... F02N 11/04; F02N 15/022; F16H 7/08; F16H 2007/0865; F16H 2007/0897; F16H 37/02

See application file for complete search history.

(56) References Cited

U.S. PATENT DOCUMENTS

| | | | |
|---|---|---|---|
| 6,397,808 B1* | 6/2002 | Tanaka | F02N 11/04 123/179.25 |
| 8,169,100 B2* | 5/2012 | Dooley | F02C 7/275 123/198 R |
| 2014/0130635 A1* | 5/2014 | Kees | F02N 11/006 74/7 R |
| 2017/0248196 A1* | 8/2017 | Turner | F02N 11/0851 |
| 2018/0100564 A1* | 4/2018 | Fliearman | F02N 11/0851 |

FOREIGN PATENT DOCUMENTS

| | | |
|---|---|---|
| JP | 2004-011596 A | 1/2004 |
| KR | 10-1499256 B | 3/2015 |
| KR | 10-2016-0056529 A | 5/2016 |
| KR | 10-2018-0129067 A | 12/2018 |

* cited by examiner

*Primary Examiner* — Hung Q Nguyen
*Assistant Examiner* — Mark L. Greene
(74) *Attorney, Agent, or Firm* — Morgan, Lewis & Bockius LLP (57) ABSTRACT

A starter-generator system may include a starter-generator configured to provide an engine-cranking torque or receive a generator-cranking torque, a belt drive mechanism located between the starter-generator and an engine, and a torque transmission mechanism that selectively transmits the engine-cranking torque or the generator-cranking torque between the starter-generator and the belt drive mechanism.

15 Claims, 8 Drawing Sheets

STARTER-GENERATOR SYSTEM

CROSS-REFERENCE(S) TO RELATED APPLICATIONS

The present application claims priority to Korean Patent Application No. 10-2017-0064514, filed on May 25, 2017, the entire contents of which is incorporated herein for all purposes by this reference.

BACKGROUND OF THE INVENTION

Field of the Invention

The present invention relates to a vehicle having an integrated starter-generator. More specifically, the present invention relates to a starter-generator system configured to enhance a starting efficiency of an engine and may stably implement power generation of a generator when a starter-generator with low output power requirements and low torque requirements is applied.

Description of Related Art

An internal combustion engine may include a starter and a generator (or an alternator).

The starter is connected to an engine through a pinion mounted on an output shaft of the starter and a ring gear formed on an external surface of a flywheel of the engine. The starter provides an engine-cranking torque to the flywheel or a crankshaft of the engine to facilitate movement of a piston and rotate a camshaft during the ignition of the engine. For example, when a torque required to start the engine is 102 N·m, the torque of the starter is 7 N·m, and a gear ratio between the ring gear of the flywheel and the pinion of the starter is 20:1, the starter may provide a torque of 140 N·m to the engine.

The generator charges a battery and provides electric output to correspond to an electric load of a vehicle. Torque is applied to the generator by a belt frictionally engaged with a generator pulley and a crank pulley of the engine to generate an electric load in the generator.

Recently, integrated starter-generators having a starter and a generator integrated with each other have been developed. Integrated starter-generators may have advantages of reducing a required disposition region, weight, component cost, and assembly time.

However, an integrated starter-generator has a structure in which an inverter is added to a conventional alternator, and, therefore, is impossible to actuate an engine when a pulley ratio between a crank pulley of the engine and a starter-generator pulley is small (approximately 2.5:1). Accordingly, when the required power and a torque of the starter-generator increases, the engine may be easily actuated. For example, the required power of the starter-generator is 3 kW or more, the required torque of the starter-generator is 50 N·m or more.

Since the integrated starter-generator needs to have the high output power requirement and the high torque requirement, as mentioned above, a capacity and cost of the starter-generator increase.

The information disclosed in this Background of the Invention section is only for enhancement of understanding of the general background of the invention and should not be taken as an acknowledgment or any form of suggestion that this information forms the related art already known to a person skilled in the art.

BRIEF SUMMARY

Various aspects of the present invention are directed to providing a starter-generator system that may enhance a starting efficiency of an engine and may stably implement power generation of a generator even when a low-capacity starter-generator with a low output power requirement and a low torque requirement is applied.

The technical problems to be solved by the present invention are not limited to the aforementioned problems, and any other technical problems not mentioned herein will be clearly understood from the following description by those skilled in the art to which the present invention pertains.

According to various aspects of the present invention, a starter-generator system may include a starter-generator configured to provide an engine-cranking torque or receive a generator-cranking torque, a belt drive mechanism located between the starter-generator and an engine, and a torque transmission mechanism selectively transmitting the engine-cranking torque or the generator-cranking torque between the starter-generator and the belt drive mechanism.

The torque transmission mechanism may be configured to transmit the engine-cranking torque at a specific gear ratio.

The torque transmission mechanism may be configured to transmit the generator-cranking torque at a gear ratio of 1:1.

The belt drive mechanism may include two pulleys connected to the starter-generator, a crank pulley mounted on a crankshaft of the engine, and a belt frictionally engaging the two pulleys and the crank pulley.

The two pulleys may include a first pulley configured for receiving the generator-cranking torque from the belt, and a second pulley configured for providing the engine-cranking torque to the belt.

The torque transmission mechanism may include a gear train including a first gear, a second gear, and an idler gear engaged with the first and second gears.

The first gear, the second gear, and the idler gear may have a specific gear ratio.

The starter-generator may include a first shaft, and the first gear and the first pulley may be mounted on the first shaft. The second gear and the second pulley may be mounted on a second shaft, and the idler gear may be mounted on an intermediate shaft.

The first shaft, the second shaft, and the intermediate shaft may all be parallel to one another.

The starter-generator system may further include a first one-way clutch configured to limit the first shaft and the first pulley to rotate together in one direction thereof.

The first one-way clutch may be located between an internal circumferential surface of the first pulley and an external circumferential surface of the first shaft.

The first one-way clutch may be configured to allow a rotation speed of the first shaft to be greater than a rotation speed of the first pulley.

The first one-way clutch may be configured to prevent the rotation speed of the first shaft from being less than the rotation speed of the first pulley.

The starter-generator system may further include a second one-way clutch configured to limit the second shaft and the second pulley to rotate together in one direction thereof.

The second one-way clutch may be located between an internal circumferential surface of the second pulley and an external circumferential surface of the second shaft.

The second one-way clutch may be configured to allow a rotation speed of the second shaft to be less than a rotation speed of the second pulley.

The second one-way clutch may be configured to prevent the rotation speed of the second shaft from being greater than the rotation speed of the second pulley.

The starter-generator system may further include a tensioner configured to apply a tension to the belt between the first and second pulleys.

According to an exemplary embodiment of the present invention, it is possible to enhance the starting efficiency of the engine and stably implement power generation of the generator even when a low-capacity starter-generator with the low output power requirement and the low torque requirement is applied.

According to an exemplary embodiment of the present invention, the torque transmission mechanism configured for selectively transmitting an engine-cranking torque and a generator-cranking torque is disposed between the shafts of the starter-generator and the belt drive mechanism to increase the engine-cranking torque in the starting mode of the starter-generator wherein a low-capacity starter-generator with the low output power requirement and the low torque requirement may be utilized, reducing a total component cost.

Furthermore, according to an exemplary embodiment of the present invention, the torque transmission mechanism transmits the generator-cranking torque at a gear ratio of 1:1 in the generating mode of the starter-generator wherein stable power generation may be maintained efficiency.

In addition, according to an exemplary embodiment of the present invention, the integrated one-way clutches are provided within at least some pulleys of the belt drive mechanism wherein a region occupied by the belt drive mechanism may be reduced, and only one tensioner may be located between the pulley transmitting an engine-cranking torque and the pulley transmitting a generator-cranking torque wherein component cost and overall manufacturing cost are significantly reduced.

The methods and apparatuses of the present invention have other features which will be apparent from or are set forth in more detail in the accompanying drawings, which are incorporated herein, and the following Detailed Description, which together is configured to explain certain principles of the present invention.

BRIEF DESCRIPTION OF THE DRAWINGS

FIG. 5 illustrates a starting mode of a starter-generator;

FIG. 6 illustrates a generating mode of the starter-generator;

FIG. 7 illustrates a starting mode of a starter-generator; FIG. 8 illustrates a generating mode of the starter-generator.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Terms, including "first", "second", "A", "B", "(a)", "(b)", and the like, may be used herein to describe elements of the present invention. Such terms are only used to distinguish one element from another element, and the substance, sequence, order, or number of these elements is not limited by these terms. Unless otherwise defined, all terms used herein, including technical and scientific terms, have the same meaning as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
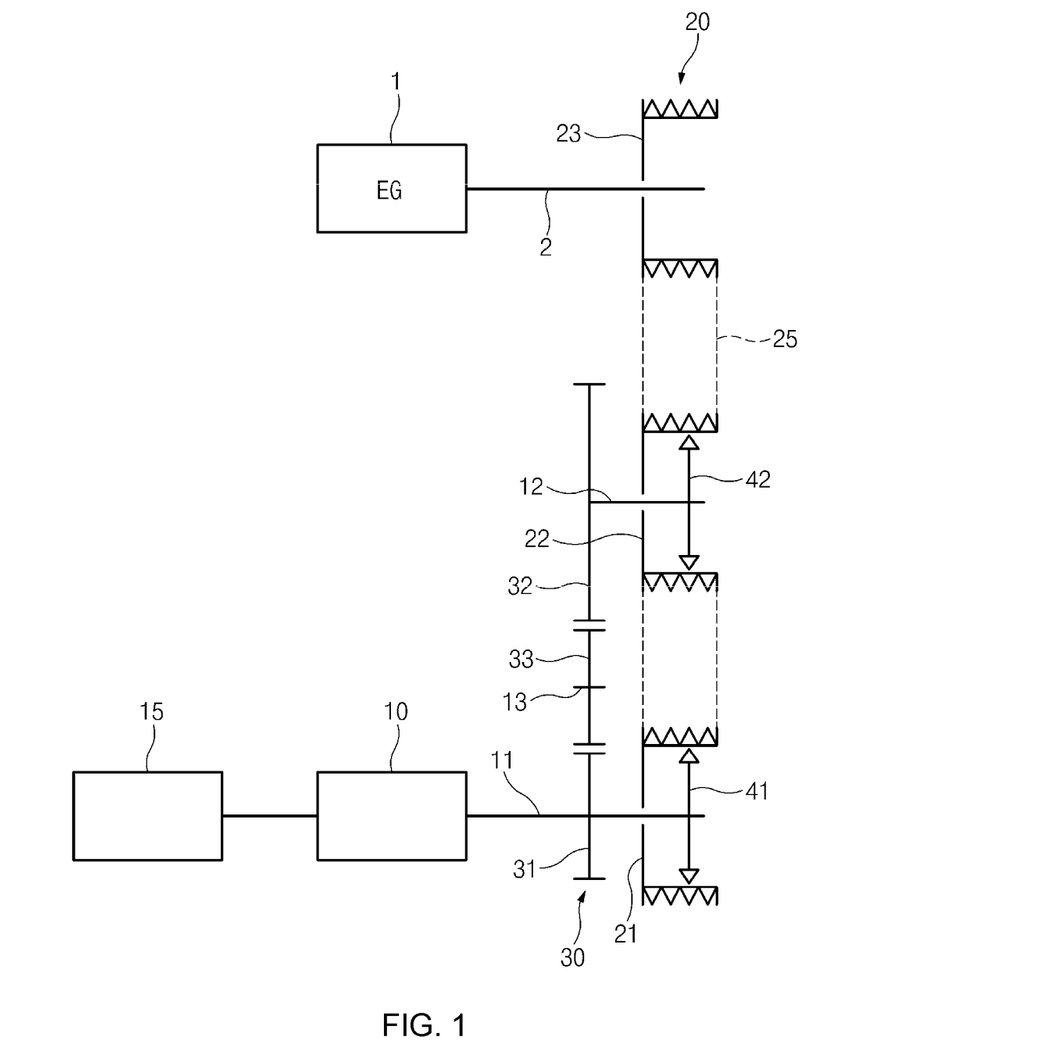
FIG. 1 is a schematic view illustrating a structure in which a starter-generator system, according to an exemplary embodiment of the present invention, is connected to an engine.

Referring to FIG. 1, a starter-generator system according to an exemplary embodiment of the present invention may include a starter-generator 10 and a belt drive mechanism 20 located between the starter-generator 10 and an engine 1.

The starter-generator 10 may be a motor-generator having a motor and a generator mechanically coupled together, wherein the motor may generate a rotational force using electrical energy, and the generator may generate electrical energy y using a rotational force transmitted externally. A battery 15 may be connected to the starter-generator 10. The battery 15 may supply electrical energy to the starter-generator 10, or may be charged with electrical energy generated by the starter-generator 10.

The starter-generator 10 may be configured to provide an engine-cranking torque through a belt 25 of the belt drive mechanism 20 or to receive a generator-cranking torque from the belt 25 of the belt drive mechanism 20. The engine-cranking torque may be a torque transmitted from the starter-generator 10 to a crank pulley 23 of the engine 1 in a starting mode of the starter-generator 10, and the generator-cranking torque may be a torque transmitted from the crank pulley 23 of the engine 1 to the starter-generator 10 in a generating mode of the starter-generator 10.

The starter-generator 10 may be actuated by a current supplied from the battery 15 and may provide an engine-cranking torque to the belt drive mechanism 20. Furthermore, the starter-generator 10 may generate electrical energy using the generator-cranking torque transmitted from the belt drive mechanism 20, and the generated electrical energy may be supplied to the battery 15.

The belt drive mechanism 20 may include two pulleys 21 and 22 connected to the starter-generator 10, the crank pulley 23 mounted on a crankshaft 2 of the engine 1, and the belt 25 frictionally engaging the two pulleys 21 and 22 and the crank pulley 23.

The two pulleys 21 and 22 may include the first pulley 21 and the second pulley 22 which are separated from each other. The first pulley 21 may be configured to receive the generator-cranking torque from the belt 25 in the generating mode of the starter-generator 10, and the second pulley 22 may be configured to transmit the engine-cranking torque to the belt 25 in the starting mode of the starter-generator 10. The first pulley 21 may be mounted on a first shaft 11 of the starter-generator 10, and the second pulley 22 may be mounted on a second shaft 12 of the starter-generator 10 which is parallel to the first shaft 11 thereof.

A torque transmission mechanism 30 may be located between the starter-generator 10 and the belt drive mechanism 20 to selectively transmit the engine-cranking torque and the generator-cranking torque.

According to an exemplary embodiment of the present invention, the torque transmission mechanism 30 may increase the engine-cranking torque transmitted from the starter-generator 10 to the belt 25 at a specific gear ratio (e.g., 6:1) and may maintain a generator-cranking torque transmitted from the belt 25 to the starter-generator 10 at a gear ratio of 1:1.

According to an exemplary embodiment, as illustrated in FIG. 1, FIG. 2, FIG. 3, and FIG. 4, the torque transmission mechanism 30 may be a gear train 30 that includes a first gear 31, a second gear 32, and an idler gear 33 engaged with the first and second gears 31 and 32.

The first gear 31 may be mounted on the first shaft 11, and the starter-generator 10 may be provided with the first shaft 11. The first gear 31 and the first pulley 21 may be mounted on the first shaft 11 to be separated from each other.

The second gear 32 may be mounted on the second shaft 12 parallel to the first shaft 11, and the second gear 32 and the second pulley 22 may be mounted on the second shaft 12 to be separated from each other.

The idler gear 33 may be mounted on an intermediate shaft 13 which is parallel to the first and second shafts 11 and 12, and teeth of the idler gear 33 may be individually engaged with teeth of the first gear 31 and teeth of the second gear 32.

The first shaft 11, the second shaft 12, and the intermediate shaft 13 may be separated from one another, allowing the first gear 31, the second gear 32, and the idler gear 33 to be stably engaged with each other.

The gear train 30 may have a specific gear ratio (e.g., 6:1). Accordingly, when a torque of the first shaft 11 is transmitted to the second shaft 12 through the gear train 30, the gear ratio of the gear train 30 may cause a decrease in the rotation speed of the second shaft 12 and an increase in the torque of the second shaft 12. The gear ratio of the gear train 30 may be configured to correspond to the capacity of the starter-generator 10.

Figure 2:
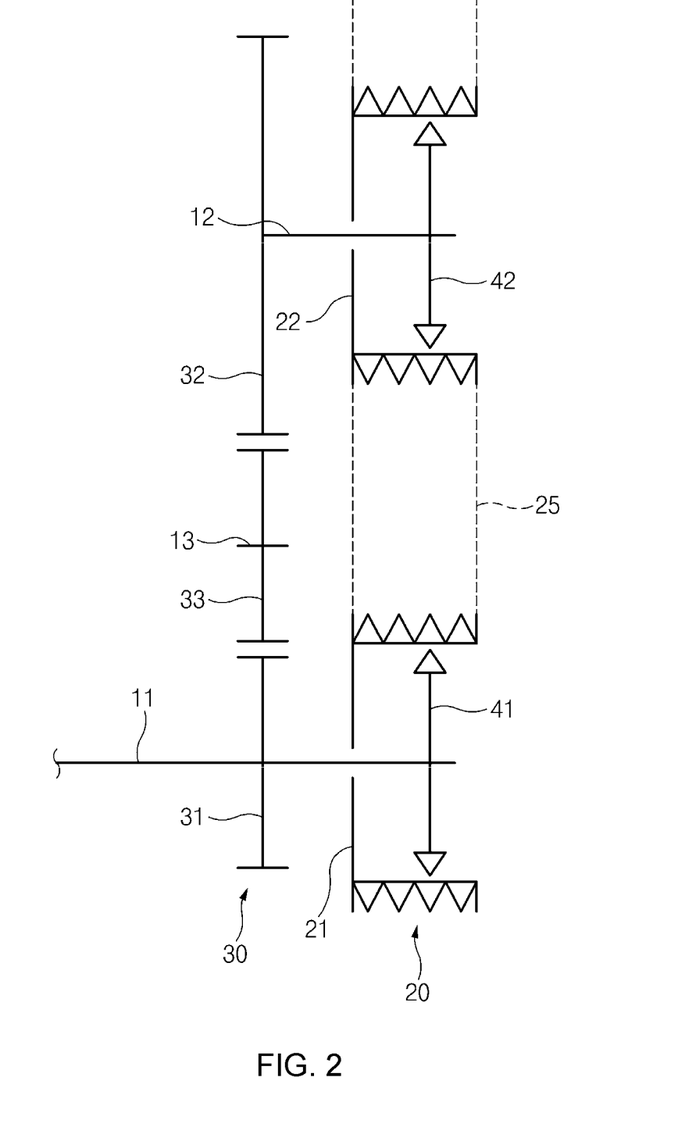
FIG. 2 is a schematic view of the starter-generator system according to an exemplary embodiment of the present invention.

A first one-way clutch 41 may be mounted on the first pulley 21. According to an exemplary embodiment, the first one-way clutch 41 may be located between the internal circumferential surface of the first pulley 21 and the external circumferential surface of the first shaft 11, and may thus be integrated with the first pulley 21. The first one-way clutch 41 may be configured to limit the first shaft 11 and the first pulley 21 to rotate together in one direction thereof.

According to an exemplary embodiment, the first one-way clutch 41 may be configured to allow the first shaft 11 to rotate at a greater speed than the first pulley 21 and to prevent the first shaft 11 from rotating at a lower speed than the first pulley 21.

The first one-way clutch 41 may be configured to disengage the first shaft 11 and the first pulley 21 when the rotation speed of the first shaft 11 is greater than that of the first pulley 21. Accordingly, the first shaft 11 and the first pulley 21 may rotate freely relative to each other when the rotation speed of the first shaft 11 is greater than that of the first pulley 21.

In contrast, the first one-way clutch 41 may be configured to engage the first shaft 11 and the first pulley 21 when the rotation speed of the first shaft 11 is less than that of the first pulley 21. Accordingly, the first shaft 11 and the first pulley 21 may rotate together in the same direction when the rotation speed of the first shaft 11 is less than that of the first pulley 21.

A second one-way clutch 42 may be mounted on the second pulley 22. According to an exemplary embodiment, the second one-way clutch 42 may be located between the internal circumferential surface of the second pulley 22 and the external circumferential surface of the second shaft 12, and may thus be integrated with the second pulley 22. The second one-way clutch 42 may be configured to limit the second shaft 12 and the second pulley 22 to rotate together in one direction thereof.

According to an exemplary embodiment, the second one-way clutch 42 may be configured to allow the second shaft 12 to rotate at a lower speed than the second pulley 22 and to prevent the second shaft 12 from rotating at a greater speed than the second pulley 22.

The second one-way clutch 42 may be configured to disengage the second shaft 12 and the second pulley 22 when the rotation speed of the second shaft 12 is less than that of the second pulley 22. Accordingly, the second shaft 12 and the second pulley 22 may rotate freely relative to each other when the rotation speed of the second shaft 12 is less than that of the second pulley 22.

In contrast, the second one-way clutch 42 may be configured to engage the second shaft 12 and the second pulley 22 when the rotation speed of the second shaft 12 is greater than that of the second pulley 22. Accordingly, the second shaft 12 and the second pulley 22 may rotate together in the same direction when the rotation speed of the second shaft 12 is greater than that of the second pulley 22.

Figure 3:
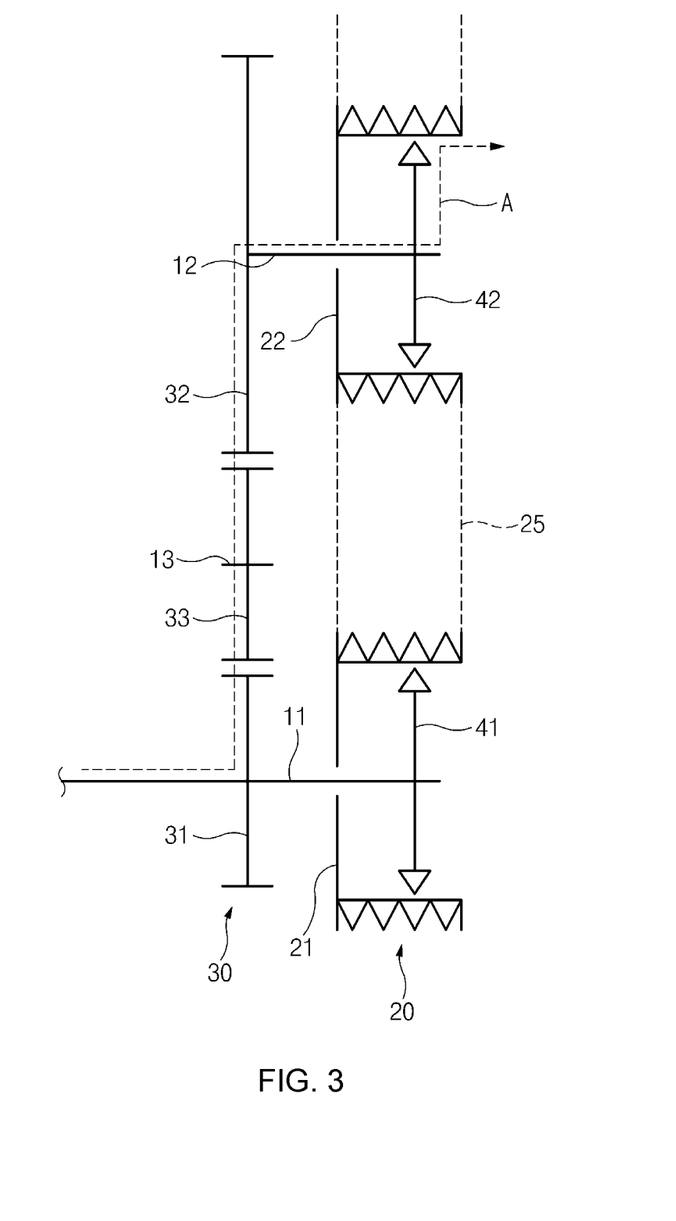
FIG. 3 illustrates a starting mode of a starter-generator in the starter-generator system according to the exemplary embodiment of FIG. 2.

As illustrated in FIG. 3, when the starter-generator 10 operates in the starting mode in which the starter-generator 10 starts up the engine 1, the torque of the first shaft 11 may be transmitted to the second shaft 12 through the gear train 30, and the gear ratio of the gear train 30 may cause a decrease in the rotation speed of the second shaft 12 and an increase in the torque of the second shaft 12. Since the engine 1 is in a stationary state before starting, the crank pulley 23 and the first and second pulleys 21 and 22 may all be at rest, and the rotation speed of the second shaft 12 may be greater than that of the second pulley 22. When the second shaft 12 and the second pulley 22 are engaged with each other by the second one-way clutch 42, the second pulley 22 may rotate together with the second shaft 12 at the same rotation speed and in the same direction thereof. Accordingly, the torque of the second shaft 12 may be transmitted to the second pulley 22 (see arrow A of FIG. 3), and the belt 25 of the belt drive mechanism 20 may drive the crank pulley 23 of the engine 1, starting the engine 1.

Since the rotation speed of the first shaft 11 is greater than that of the first pulley 21 in the starting mode of the starter-generator 10, the first shaft 11 and the first pulley 21 may be disengaged from each other by the first one-way clutch 41 and thus may rotate freely relative to each other. As a result, the torque of the first shaft 11 may not be transmitted to the first pulley 21.

Figure 4:
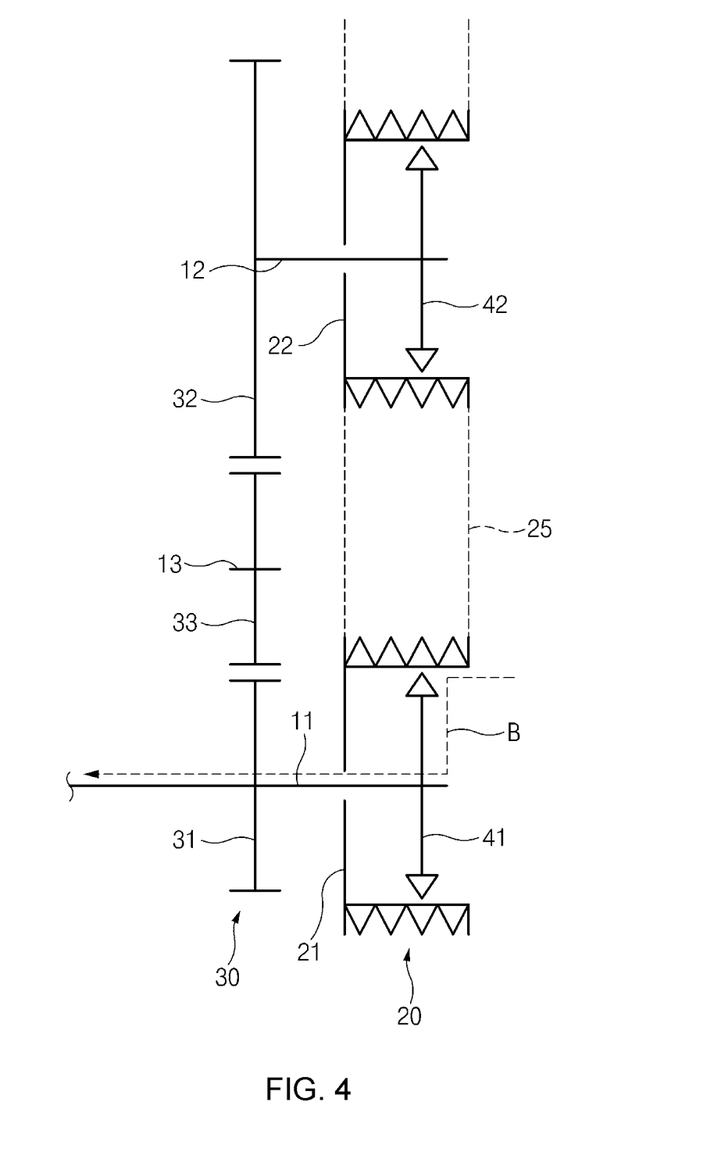
FIG. 4 illustrates a generating mode of the starter-generator in the starter-generator system according to the exemplary embodiment of FIG. 2.

As illustrated in FIG. 4, in a generating mode of the starter-generator 10 in which the starter-generator 10 is driven by the engine 1 to generate electrical energy when the engine 1 operates, the starter-generator 10 may be in a stationary state, and therefore the rotation speed of the first shaft 11 may be less than that of the first pulley 21. When the first shaft 11 and the first pulley 21 are engaged with each other by the first one-way clutch 41, the first shaft 11 may rotate together with the first pulley 21 at the same rotation speed and in the same direction thereof. Accordingly, the torque of the first pulley 21 may be transmitted to the first shaft 11 (see arrow B of FIG. 4), and the first shaft 11 of the starter-generator 10 may rotate to generate electrical energy.

Since the rotation speed of the second shaft 12 is less than that of the second pulley 22 in the generating mode of the starter-generator 10, the second shaft 12 and the second pulley 22 may be disengaged from each other by the second one-way clutch 42 and thus may rotate freely relative to each other. As a result, the torque of the second pulley 22 may not be transmitted to the second shaft 12.

Figure 5:
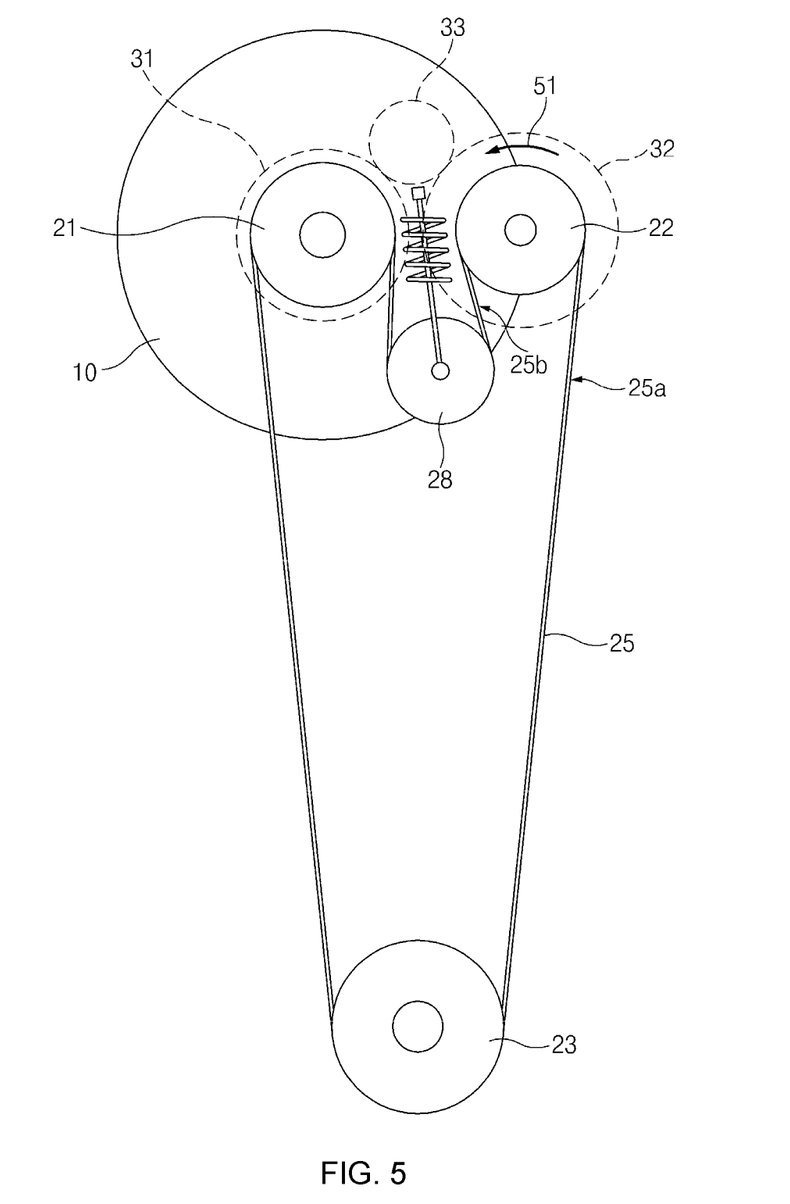
FIG. 5 is a front view of a belt drive mechanism of a starter-generator system according to an exemplary embodiment of the present invention, where
Figure 6:
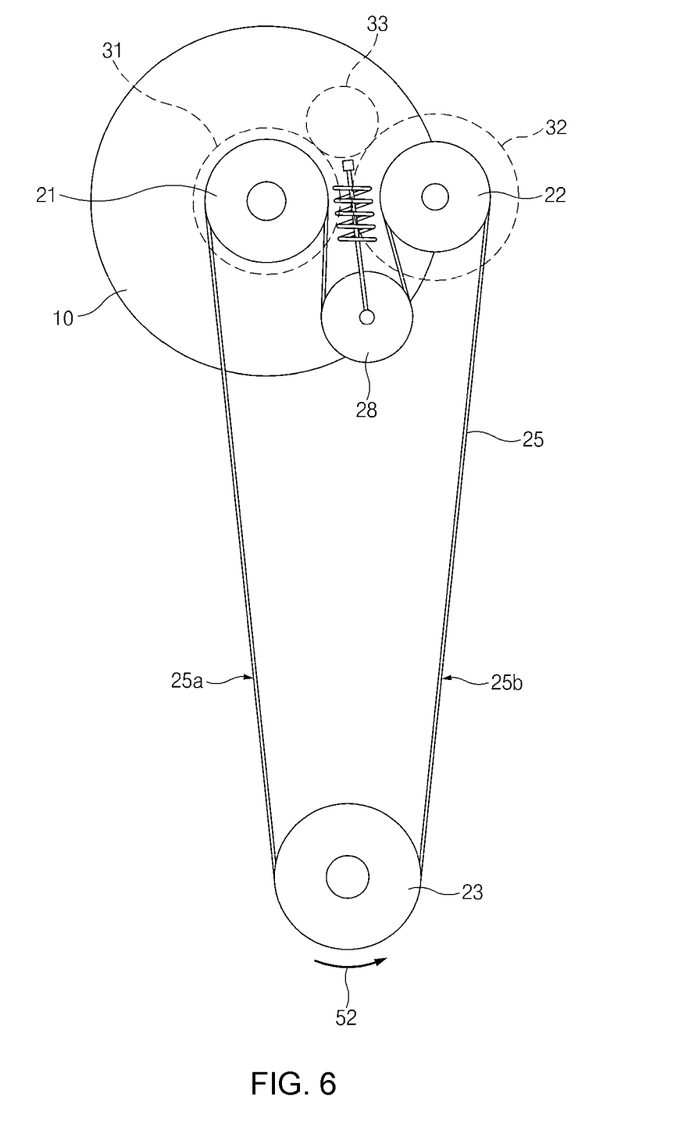
FIG. 6 is a front view of the belt drive mechanism of the starter-generator system according to an exemplary embodiment of the present invention, where

FIG. 5 and FIG. 6 are front views of the belt drive mechanism 20 according to an exemplary embodiment of the present invention.

As illustrated in FIG. 5 and FIG. 6, the belt 25 may be configured to frictionally engage the first pulley 21, the second pulley 22, and the crank pulley 23 of the engine 1. The first pulley 21 may be disposed on the left side of the crank pulley 23, and the second pulley 22 may be disposed on the right side of the crank pulley 23.

A tensioner 28 may be located between the first and second pulleys 21 and 22 to apply a tension to the belt 25. The tensioner 28 may be a passive tensioner or an active tensioner.

As illustrated in FIG. 5, in the starting mode of the starter-generator 10, a torque 51 of the second pulley 22 may be transmitted to the crank pulley 23 of the engine 1, and the belt 25 may include a tension-side 25a and a slack-side 25b on opposite sides of the second pulley 22. FIG. 5 illustrates a state in which the torque 51 of the second pulley 22 is transmitted in a counterclockwise direction, the tension-side 25a of the belt 25 is formed on the right hand side of the second pulley 22, and the slack-side 25b of the belt 25 is formed on the left hand side of the second pulley 22. The tensioner 28 may extend the slack-side 25b of the belt 25, and thus the torque 51 of the starter-generator 10 may be stably transmitted to the crank pulley 23 of the engine 1. As a result, the starter-generator 10 may actuate the engine 1.

As illustrated in FIG. 6, in the generating mode of the starter-generator 10, a torque 52 of the crank pulley 23 of the engine 1 may be transmitted to the first pulley 21, and the belt 25 may include the tension-side 25a and the slack-side 25b on opposite sides of the crank pulley 23 of the engine 1. FIG. 6 illustrates a state in which the torque 52 of the crank pulley 23 is transmitted in the counterclockwise direction, the tension-side 25a of the belt 25 is formed on the left hand side of the crank pulley 23, and the slack-side 25b of the belt 25 is formed on the right hand side of the crank pulley 23. The tensioner 28 may extend the slack-side 25b of the belt 25, and thus the torque 52 of the crank pulley 23 may be stably transmitted to the first pulley 21. As a result, the starter-generator 10 may generate electrical energy to charge the battery 15.

FIG. 5 and FIG. 6 illustrate the first pulley 21 disposed on the left side of the crank pulley 23, the second pulley 22 disposed on the right side of the crank pulley 23, and the torques 51 and 52 transmitted in the counterclockwise direction thereof. However, the present invention is not limited thereto, and various other structures are possible.

Figure 7:
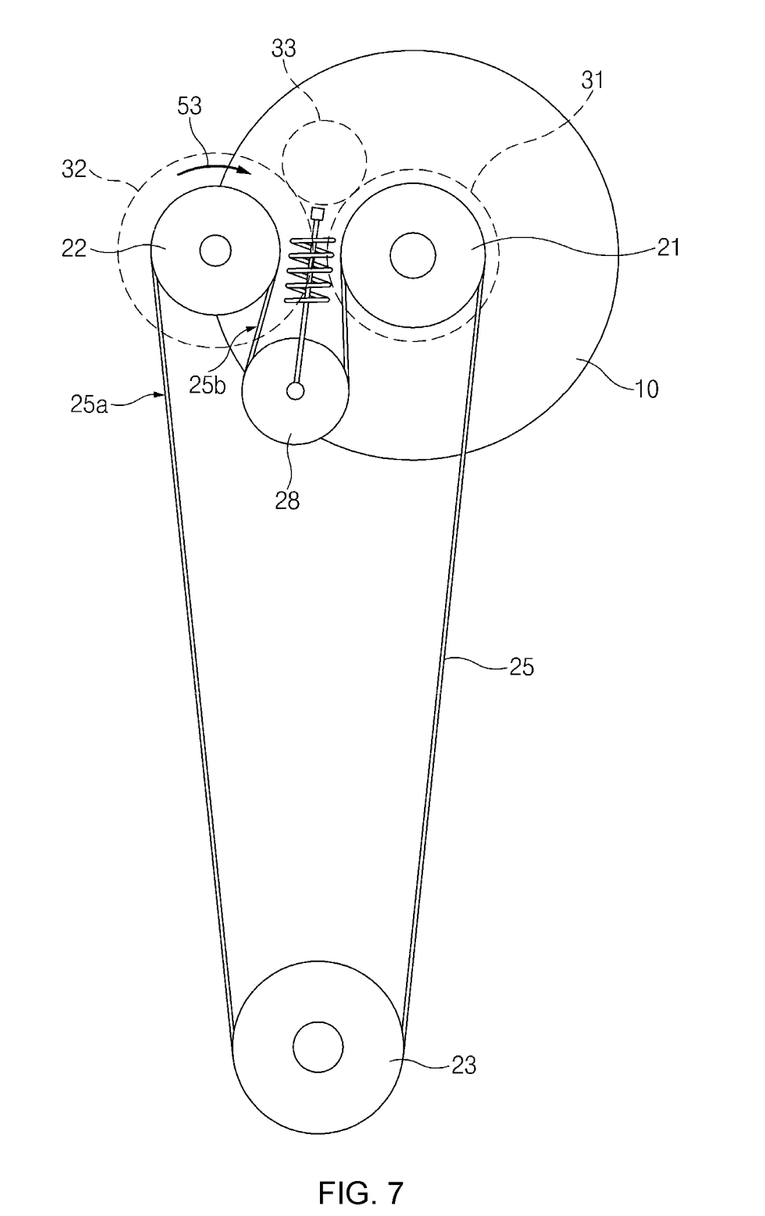
FIG. 7 is a front view of a belt drive mechanism of a starter-generator system according to another exemplary embodiment of the present invention, where
Figure 8:
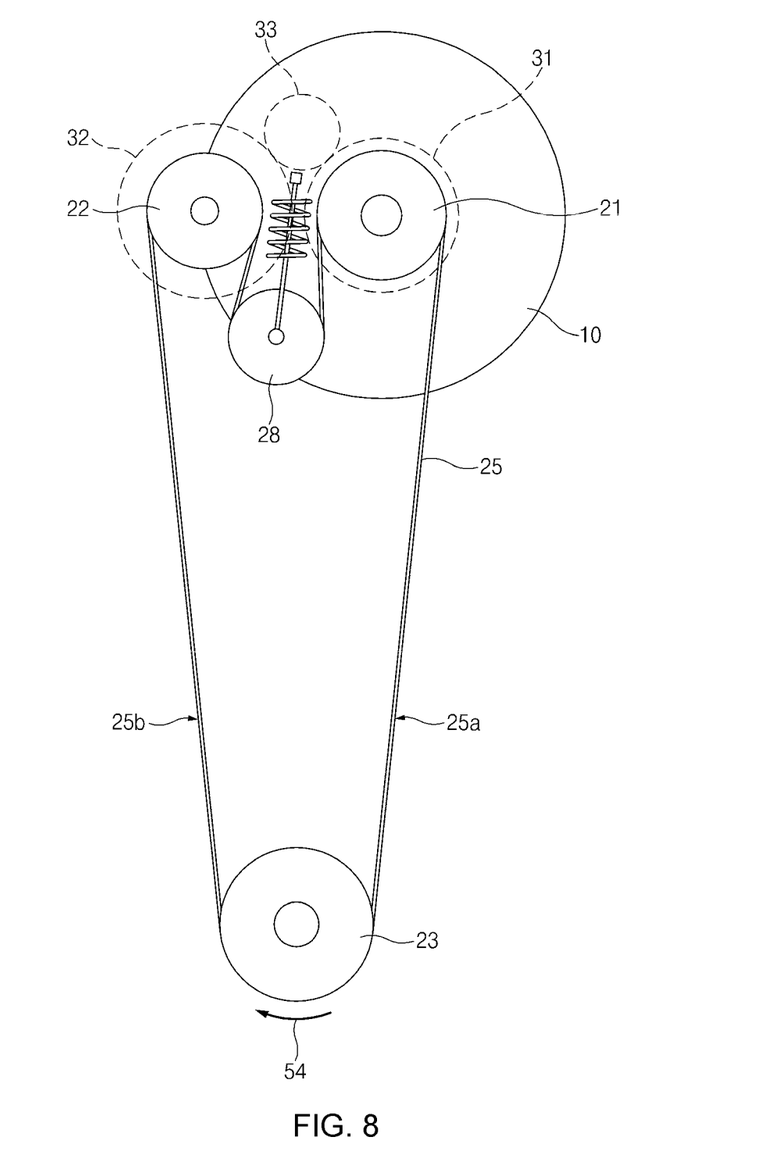
FIG. 8 is a front view of the belt drive mechanism of the starter-generator system according to another exemplary embodiment of the present invention, where

FIG. 7 and FIG. 8 are front views of the belt drive mechanism 20 according to another exemplary embodiment of the present invention.

As illustrated in FIG. 7 and FIG. 8, the belt 25 may be configured to frictionally engage the first pulley 21, the second pulley 22, and the crank pulley 23 of the engine 1. The first pulley 21 may be disposed on the right hand side of the crank pulley 23, and the second pulley 22 may be disposed on the left hand side of the crank pulley 23.

The tensioner 28 may be located between the first and second pulleys 21 and 22 to apply tension to the belt 25. The tensioner 28 may be a passive tensioner or an active tensioner.

As illustrated in FIG. 7, in the starting mode of the starter-generator 10, a torque 53 of the second pulley 22 may be transmitted to the crank pulley 23 of the engine 1, and the belt 25 may include the tension-side 25a and the slack-side 25b on opposite sides of the second pulley 22. FIG. 7 illustrates a state in which the torque 53 of the second pulley 22 is transmitted in a clockwise direction, the tension-side 25a of the belt 25 is formed on the right hand side of the second pulley 22, and the slack-side 25b of the belt 25 is formed on the left hand side of the second pulley 22. The tensioner 28 may extend the slack-side 25b of the belt 25, and thus the torque 53 of the starter-generator 10 may be stably transmitted to the crank pulley 23 of the engine 1. As a result, the engine 1 may start.

As illustrated in FIG. 8, in the generating mode of the starter-generator 10, a torque 54 of the crank pulley 23 of the engine 1 may be transmitted to the first pulley 21, and the belt 25 may include the tension-side 25a and the slack-side 25b on opposite sides of the crank pulley 23 of the engine 1. FIG. 8 illustrates a state in which the torque 54 of the crank pulley 23 is transmitted in the clockwise direction, the tension-side 25a of the belt 25 is formed on the left hand side of the crank pulley 23, and the slack-side 25b of the belt 25 is formed on the right hand side of the crank pulley 23. The tensioner 28 may extend the slack-side 25b of the belt 25, and thus the torque 54 of the crank pulley 23 may be stably transmitted to the first pulley 21. As a result, the starter-generator 10 may generate electrical energy to charge the battery 15.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and equivalents are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A starter-generator system comprising:
   a starter-generator configured to provide an engine-cranking torque or to receive a generator-cranking torque;
   a belt drive mechanism located between the starter-generator and an engine; and
   a torque transmission mechanism selectively transmitting the engine-cranking torque or the generator-cranking torque between the starter-generator and the belt drive mechanism,
   wherein the torque transmission mechanism is configured to transmit the engine-cranking torque at a predetermined gear ratio; and
   wherein the belt drive mechanism includes two pulleys connected to the starter-generator, a crank pulley mounted on a crankshaft of the engine, and a belt frictionally engaging the two pulleys and the crank pulley.

2. The starter-generator system of claim 1, wherein the torque transmission mechanism is configured to transmit the generator-cranking torque at a gear ratio of 1:1.

3. The starter-generator system of claim 1, wherein the two pulleys include a first pulley receiving the generator-cranking torque from the belt and a second pulley providing the engine-cranking torque to the belt.

4. The starter-generator system of claim 3, wherein the torque transmission mechanism includes a gear train including a first gear, a second gear, and an idler gear engaged with the first gear and the second gear.

5. The starter-generator system of claim 4, wherein the first gear, the second gear, and the idler gear form the predetermined gear ratio.

6. The starter-generator system of claim 5, wherein the starter-generator has a first shaft,
   wherein the first gear and the first pulley are mounted on the first shaft,
   wherein the second gear and the second pulley are mounted on a second shaft,
   wherein the idler gear is mounted on an intermediate shaft, and
   wherein the first shaft, the second shaft, and the intermediate shaft are in parallel to one another.

7. The starter-generator system of claim 6, further including:
   a first one-way clutch limiting the first shaft and the first pulley to rotate together in one direction thereof.

8. The starter-generator system of claim 7, wherein the first one-way clutch is located between an internal circumferential surface of the first pulley and an external circumferential surface of the first shaft.

9. The starter-generator system of claim 7, wherein the first one-way clutch is configured to allow a rotation speed of the first shaft to be greater than a rotation speed of the first pulley.

10. The starter-generator system of claim 7, wherein the first one-way clutch is configured to prevent a rotation speed of the first shaft from being less than a rotation speed of the first pulley.

11. The starter-generator system of claim 6, further including:
    a second one-way clutch limiting the second shaft and the second pulley to rotate together in one direction thereof.

12. The starter-generator system of claim 11, wherein the second one-way clutch is located between an internal circumferential surface of the second pulley and an external circumferential surface of the second shaft.

13. The starter-generator system of claim 11, wherein the second one-way clutch is configured to allow a rotation speed of the second shaft to be less than a rotation speed of the second pulley.

14. The starter-generator system of claim 11, wherein the second one-way clutch is configured to prevent a rotation speed of the second shaft from being greater than a rotation speed of the second pulley.

15. The starter-generator system of claim 3, further including:
    a tensioner configured to apply a tension to the belt between the first pulley and the second pulley.

* * * * *